(12) United States Patent
Wallace

(10) Patent No.: US 7,765,579 B2
(45) Date of Patent: Jul. 27, 2010

(54) SECURITY DEPLOYMENT SYSTEM

(75) Inventor: David Robert Wallace, San Francisco, CA (US)

(73) Assignee: Greencastle Technology, Inc., San Francisco, CA (US)

( * ) Notice: Subject to any disclaimer, the term of this patent is extended or adjusted under 35 U.S.C. 154(b) by 1066 days.

(21) Appl. No.: 11/220,160

(22) Filed: Sep. 6, 2005

(65) Prior Publication Data

US 2006/0064737 A1    Mar. 23, 2006

Related U.S. Application Data

(60) Provisional application No. 60/607,561, filed on Sep. 7, 2004.

(51) Int. Cl.
*H04L 29/06* (2006.01)
(52) U.S. Cl. .............. 726/1; 717/136; 726/24; 713/194
(58) Field of Classification Search .......... 726/1, 726/23; 711/125; 712/209, 227, 226, 1; 709/310, 102, 223; 713/200, 201, 166, 190, 713/187, 194; 717/129, 140, 136
See application file for complete search history.

(56) References Cited

U.S. PATENT DOCUMENTS

| | | | |
|---|---|---|---|
| 2001/0042172 A1* | 11/2001 | Duesterwald et al. | 711/125 |
| 2002/0194389 A1* | 12/2002 | Worley et al. | 709/310 |
| 2004/0025145 A1* | 2/2004 | Dawson | 717/129 |
| 2004/0098607 A1* | 5/2004 | Alagna et al. | 713/200 |
| 2004/0111643 A1* | 6/2004 | Farmer | 713/201 |
| 2004/0133777 A1 | 7/2004 | Kiriansky | |
| 2005/0010804 A1 | 1/2005 | Bruening | |

* cited by examiner

*Primary Examiner*—Taghi T Arani
*Assistant Examiner*—Jason Lee
(74) *Attorney, Agent, or Firm*—Gard & Kaslow LLP

(57) ABSTRACT

To address security that can arise in information systems, the present invention uses novel methods and/or systems to enhance security in information systems, using a new way to deploy selected security policies. Instead of trying to modify a whole binary file all at once to add in code to implement additional security policies, the current invention modifies the code in memory in a piecemeal, as-needed fashion.

4 Claims, 9 Drawing Sheets

Binary Transformation Overview

Overview

System Configuration

Binary Transformation Overview

DLL Unload

Scan Code to Find Blocks

Update Address Lookup Table, ALT

Verify Targets

Compute New Label Addresses

Sequence of instructions, each of length 1:

i1, i2, i3, i4, i5, i6

Sequence with new instructions added:

i1, i2, a1, a2 i3, i4, b1, i5, c1, i6

ALT Columns (orig. code address, code length, new code address, [list of static jumps])

Original ALT – without static jump information (2, 0, 2)
(4, 0, 4)
(5, 0, 5)

↖ original address

ALT with added lengths (2, 2, 2)  {from inserting a1, a2}
(4, 1, 4)  {from inserting b1}
(5, 1, 5)  {from inserting c1}

↖ length of inserted code

ALT with accumulated lengths (2, 2, 2)
(4, 3, 4)
(5, 4, 5)

ALT (result)

(2, 0, 4)
(4, 0, 7)
(5, 0, 9)

↖ latest address (with cumulative length of added instructions)

Code Offset Adjustment Example

Figure 9

SECURITY DEPLOYMENT SYSTEM

Priority of provisional application No. 60/607561, filed Sep. 7, 2004, is hereby claimed.

FIELD OF THE INVENTION

This invention relates to the field of computer system security, specifically relating to both attacks on existing software or the introduction of unauthorized software.

BACKGROUND OF THE INVENTION

It is common to have applications corrupted or hijacked by viruses or to have Trojans run that gather passwords or other critical data and send them outside of the supposedly protected or secure computing environments.

Even hardware-enhanced security systems can be compromised in some situations through unexpected inputs from outside agents, in some cases allowing such agents to view decrypted data in the clear. For example, an unexpected flaw in application code can lead to a buffer overflow attack where foreign code is introduced through normal user input. Such foreign code then executes at the same permission level as the original application code and can easily access decrypted data in memory. Some attacks are known that use existing application code in unintended ways to execute system calls and copy data for the purposes of an attacker, without introducing new code into a process.

Furthermore, it is straightforward in some situations to modify an application program that is stored on a disk drive or other program storage area to allow access to its internal operations and its internal unencrypted data during that programs execution.

The standard way to add security policies to existing applications or system modules is to change their source code, re-compile them and then re-deploy the software. In large interdependent systems this process can take years. The ideal deployment strategy would be to deploy new security systems and policies at a customer site by modifying the existing deployed code in some way. Deployed code exists on disk storage and is loaded into a computer memory when it is to be executed. In either case, analyzing the existing code in order to add security policies is very difficult. It is even difficult to distinguish code from data within existing binaries, particularly on Intel architectures, due to the variable length instructions and the lack of information about branch targets.

SUMMARY OF THE INVENTION

To address these and other issues that can arise in information systems, the present invention uses novel methods and/or systems to enhance security in information systems, using a new way to deploy selected security policies. Instead of trying to modify a whole binary file all at once, the current invention modifies the code in memory in a piecemeal, as needed fashion.

In the following exposition the term "process" will be used in the computer operating system sense unless it is apparent from the context that the more general sense is intended. A process is the basic unit of work for an computer operating system. When one starts a program, the operating system (OS) loads the program code from disk into memory and starts a process to manage the execution of that code in memory.

According to specific embodiments of the invention, the deployment of a security policy is accomplished by means of a particular form of runtime binary modification. Runtime analysis of binary code in memory is known in the art; see Cifuentes, for example. It has also has been used to enforce security policies, as in Scott and Davidson. However, the particular highly efficient technique of this invention has not been used before.

After the Security Deployment System has been installed, the user or administrator selects which applications or services are to be run or executed with a security policy deployed. Policy can be implemented to control which administrators and which users can select approved software, as well as when this selection is made.

When any application is started, it is loaded or mapped from disk to memory and then started as an OS Process which runs the application code in memory. If the application has been selected to execute with a security policy, the Security Deployment System takes over from the OS process just before the application code is executed and manages the execution of application code within that process. The System accomplishes this by modifying the original binary code of the application in memory before it is allowed to execute, inserting checks and deleting or changing various functions and behavior to deploy a security policy. Furthermore, whenever a new DLL is loaded, providing new code to execute, the System similarly takes control and modifies the new code to deploy the security policy.

Anytime, binary code is loaded into memory either as an executable, i.e. an "exe" file, or as a DLL, the System keeps track of where that code is located. The System also keeps track of where code is moved to. Further, when a DLL is unloaded, the System updates its code location information. Such code location information is used to validate control transfer targets, described below.

In order to protect validated code from being tampered with while it is executing the System places all code to be executed in memory pages that are write protected at run time. Windows provides functions to locate all code in memory and to change permissions of memory pages. Currently it is extremely rare that a program would modify its own code—or even modify data mixed in with code. Such behavior is usually restricted to very old programs.

Blocking invalid code from executing is often called execution control. In a preferred embodiment described below, execution control is accomplished by checking the target of each transfer. An alternate embodiment uses a hardware feature for execution control often called the (non-execute) NX flag that is available on some new processors, such as those from AMD. The NX flag is applied on a per-page basis, combined with normal page permissions, and, when enabled, it blocks execution of code on that page. The so-called "PaX" versions of Linux can actually simulate an NX flag. Such a flag has been available on Sparc processors for many years. The NX flag can be used with the Security Deployment System to block unauthorized code from executing by marking all code pages as executable and the remainder pages as non-executable. This is straightforward since the System collects all code that is allowed to execute onto Code Pages. In this situation any execution transfer to an improper target will result in a hardware exception.

The advantage of the preferred embodiment is that it can be used on systems without hardware support for execution control or without simulating such support in the OS.

According to specific embodiments of the invention, binary code modification inserts checking code for policies to be enforced, integrates new functions into the old code or even modifies original behavior in other ways. Examples of such binary modifications according to specific embodiments of the invention include:

1. Block the use of improperly inserted code. The System tracks all loaded and unloaded code and its addresses at run time. The System insures that only properly loaded code is allowed to run by verifying that any and every control transfer goes to a valid code address location.
2. Insert code to validate user credentials, for example, simple login credentials or role-based permissions. Optionally, the invention can also insert code to check user behavior against desired policy, such as role-based policies.
3. Modify code to correct or protect against known types of code flaws. Such flaws could open the door for a code compromise that might open up the System. This is a continuing procedure since new attacks or analysis may in future uncover new types of flaws not known today.
4. Find code that sets up events or call-back transfers and add code to capture the information about such transfers. If code modification moves such targets, the call-back addresses will need to be changed. If the offset adjustment is known, the set-up can be adjusted by the offset amount. If the offset is unknown, the set-up call-back address will be replaced by an appropriate runtime lookup function returning the call-back target address that replaces the original set-up call-back address.
5. Control access to protected regions on disk. Basic OS disk access code is modified to require a key or keys to access certain directories or files. This mechanism protects disk resident data where it is not desired to protect the data via encryption.

Operation

According to specific embodiments of the invention, applications function normally within the System, without the need for source code modification. At startup, the System verifies its execution environment to prevent copying of or tampering with either System or application code. Machine identification involves a well-known procedure where certain machine-specific characteristics are determined. Application code can be protected by either encryption or signing. In Enterprise environments often biometric hardware or smart cards can provide additional or alternate identification of clients.

Security Issues

Hardware Synergy

As more secure hardware becomes available on the client side:

The OS environment can be verified—including the program loader

The reader bootstrap procedure can be made more secure when there is a secure OS In the meantime advanced obfuscation technology can be used for protecting core functions.

Problems Solved

The Security Deployment System provides for the deployment of a security policy without the need for access to source code. Further the deployed system is very efficient with respect to both execution time and memory usage.

BRIEF DESCRIPTION OF THE DRAWINGS

FIG. 9 illustrates an example of an Offset Table according to specific embodiments of the invention

DETAILED DESCRIPTION OF SPECIFIC EMBODIMENTS

Before any code can run in the Security Deployment System it must undergo a set of binary code modifications to implement a security policy. The best time to make such code transformations is just when the code is loaded from disk to memory. An application is generally started by loading an "exe" file into memory. Then as the initial code executes, additional code is loaded as needed in the form of a dynamically linked library called a DLL. Sometimes when code is no longer needed, it is unloaded from memory.

As part of the modifications done to certain code, the System verifies that the code is allocated on pages that can be separately write-protected, i.e. that contain only code. If some code is on a page that also contains data, that code is move to a code-only page.

Figure 1:
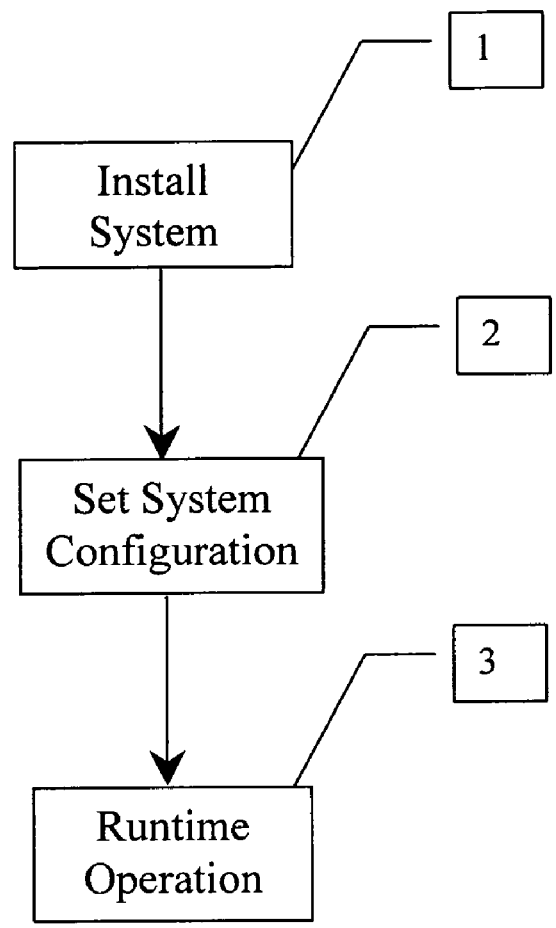
FIG. 1 provides a high-level system overview according to specific embodiments of the invention.

Please refer to FIG. 1 which provides an overview of deployment.

First in (1), the core Security Deployment System is installed. This can be done on a single machine or on multiple machines coordinated by a console display. Then in (2) the System is configured by selecting certain applications for security protection. Finally in (3), as an application starts, the Security Deployment System takes control of the OS process and its components in order to protect it.

Figure 2:
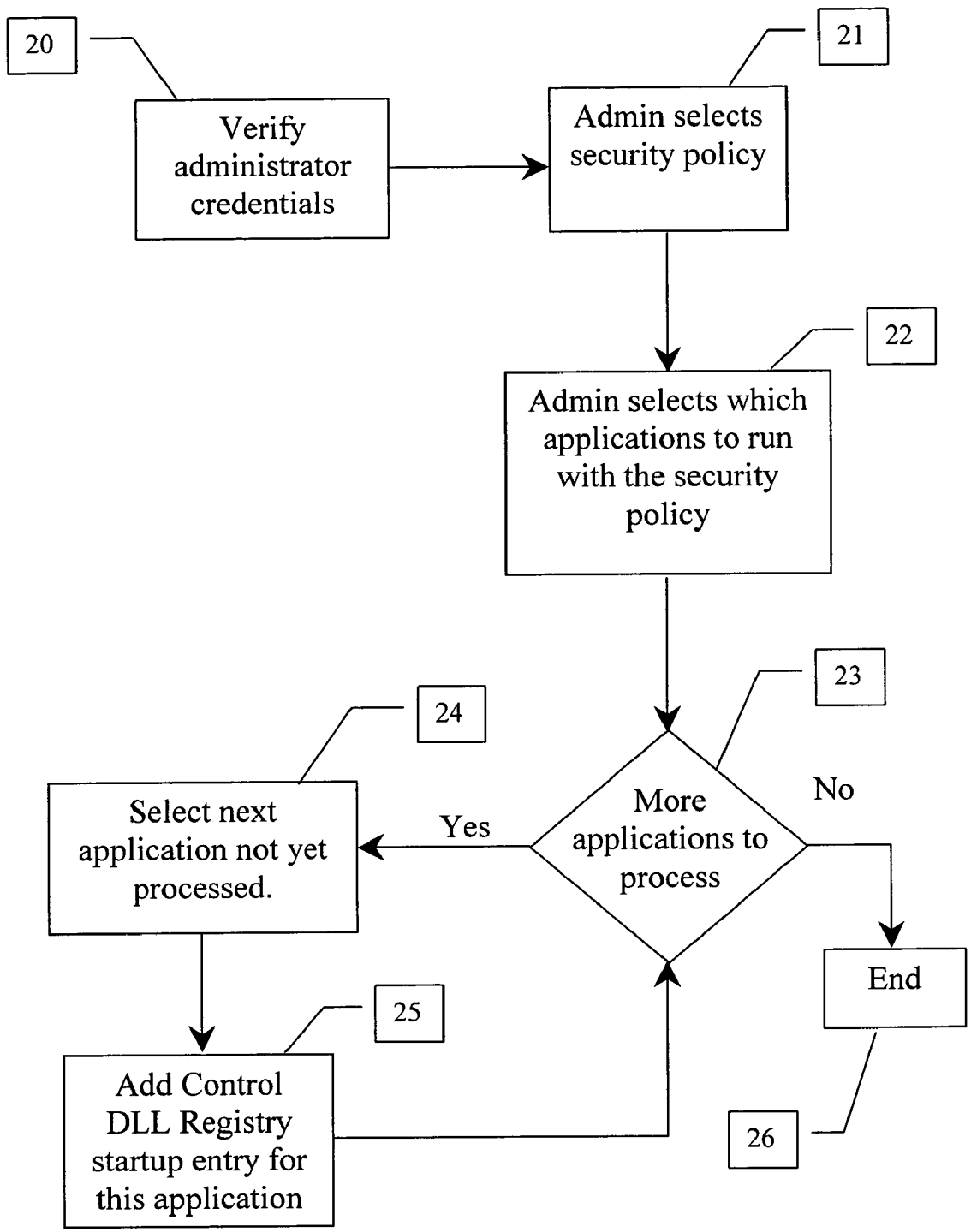
FIG. 2 illustrates setting up the System configuration according to specific embodiments of the invention.

Please refer to FIG. 2 to describe Security Deployment System Configuration. Note that administrator is often abbreviated to admin. This procedure is carried out via a Console that has a global view or via individual machine user interfaces. Later changes or additions are carried out using the same basic procedure as the initial setup where the console or user interface shows the currently selected configuration.

An update as the result of a reinstall or upgrade can be done via these procedures and the console or UI. Such updates can also be integrated in client procedure via specified scripts and APIs in order to provide automation.

In (20) the System verifies the identity of the administrator doing the configuration. This verification can be a simple password or other technique known in the art. Optionally, for additional security, the System will keep a separate list of client approved administrators and require that this administrator be on the list.

In (21) the admin selects security policies to be deployed.

In (22) the admin selects which applications to run with the selected security policy. There are many standard user interface methods to accomplish this. The result is a list of top-level applications.

In (23) the System determines whether this list is not empty or all its entries have not yet been processed. If there are more application entries to process, the System proceeds to (24). Otherwise, this procedure terminates at (26).

In (24) the System selects one unprocessed application and proceeds to (25).

In (25) the System adds the Control DLL Registry startup entry for the selected application and then proceeds to (23) to continue until all selected applications have been processed. Using a Registry entry to set up a DLL so it will run before an application starts is well known in the art.

Overview of Binary Transformation

Figure 3:
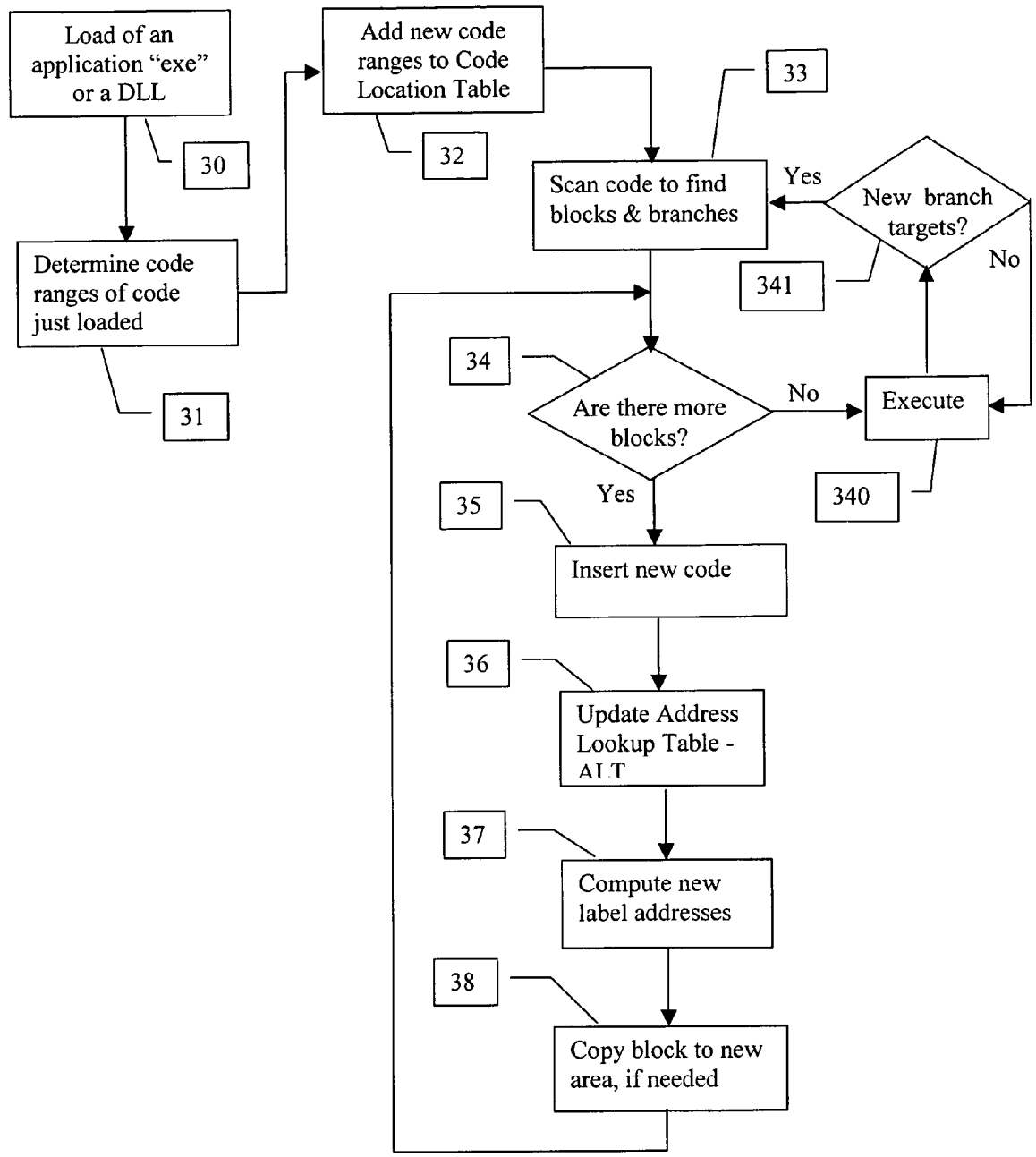
FIG. 3 illustrates an example of binary transformation according to specific embodiments of the invention. This is initiated by the loading of code, either by loading an application executable or loading a DLL.

The major steps of binary transformation according to specific embodiments of the invention are illustrated in FIG. 3. In a specific embodiment, transformation proceeds as described below.

At (30) the process is initiated when the OS initially loads an application or when the OS or application loads a DLL after the application has started.

In (31) the System uses existing functions to find the code ranges of all code sections just loaded and in (32) adds these code ranges to a Code Location Table. The Code Location Table is used to verify the targets of control transfers. A target is valid if it is within the ranges kept in this table.

Figure 5:
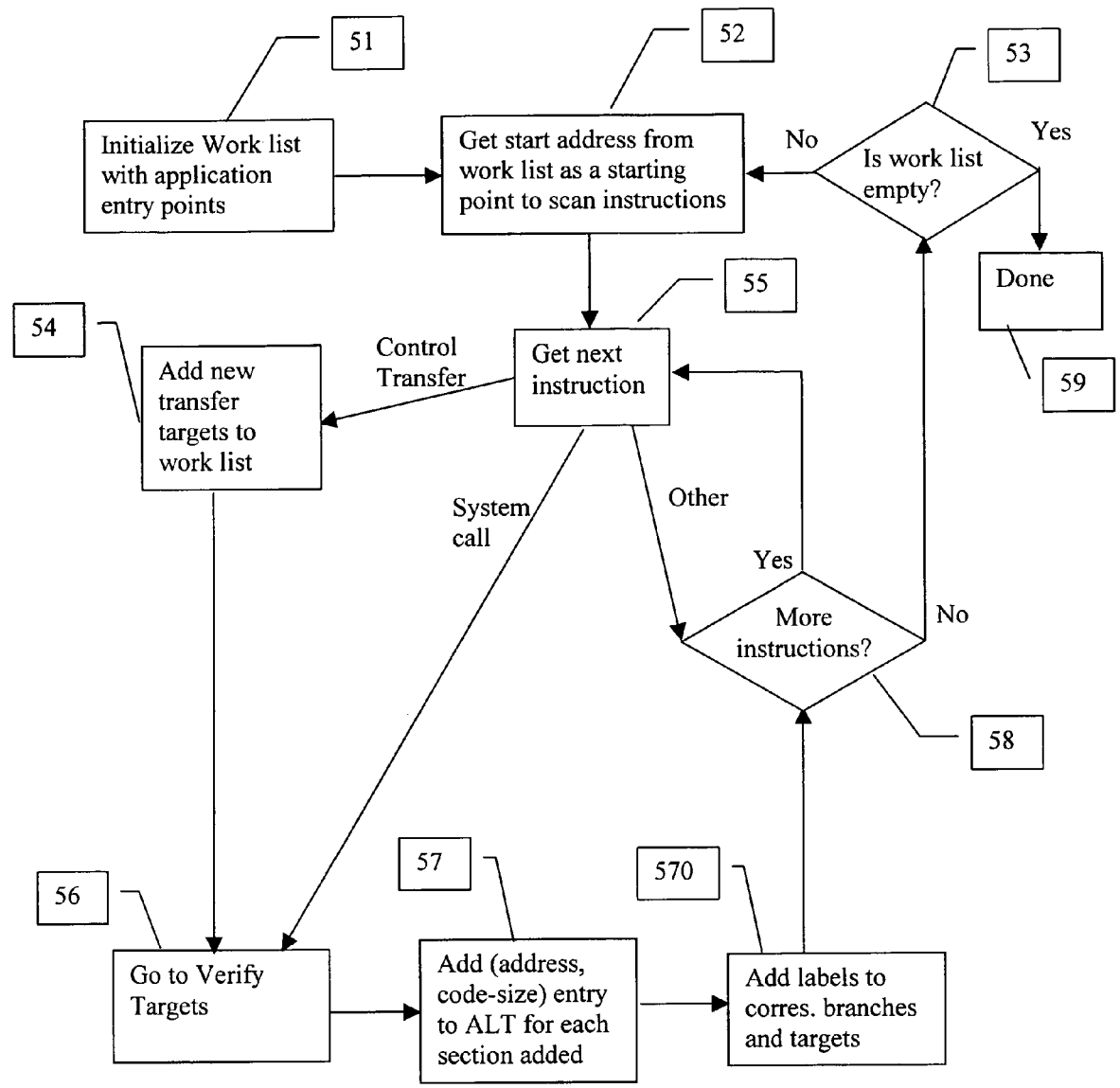
FIG. 5 illustrates further processing details of an example of binary code scanning and transformation according to specific embodiments of the invention.

In (33), scan the application code to discover code blocks. A block begins with an entry point or new branch target and ends with a branch. Locate static and dynamic branches as well as system calls. FIG. 5 provides further processing details in specific embodiments.

At (34) it is determined when no more blocks are found, in which case the System proceeds to execute the previously processed code at (340). As the code executes, instrumented dynamic branches may discover new branch targets as indicated in (341), in which case the System proceeds to (33).

In (35) insert new code as needed into the current block adding an (address, code size) entry to the ALT for each block of code added, where the address is the current address where the codes is added. Such entries go into the first two columns and the new code address column is temporarily set to the same current address.

Inserted code can be for any purpose from policy checking to just integrating additional functions for various purposes, such as reporting or auditing system behavior. Another example would be checking calls to a database with SQL in order to verify permissions within the current user context.

A further code insertion use would be for correcting or remediating known program flaws that might be used to bypass security policies. Program flaws, such as buffer overflows, are often used by internal or external hackers to accomplish attacks. Such attacks may occur during a live computer session or by embedding the attack in software, such as a worm or virus.

The Security Deployment System provides an environment in which to make code modifications. Within that environment, the Security Deployment System provides one code block at a time for code modification. With a particular block identified for modification, the actual insertion of new code and modification of existing code within such a block is well known in the art of compiler transformations and code generation.

Figure 6:
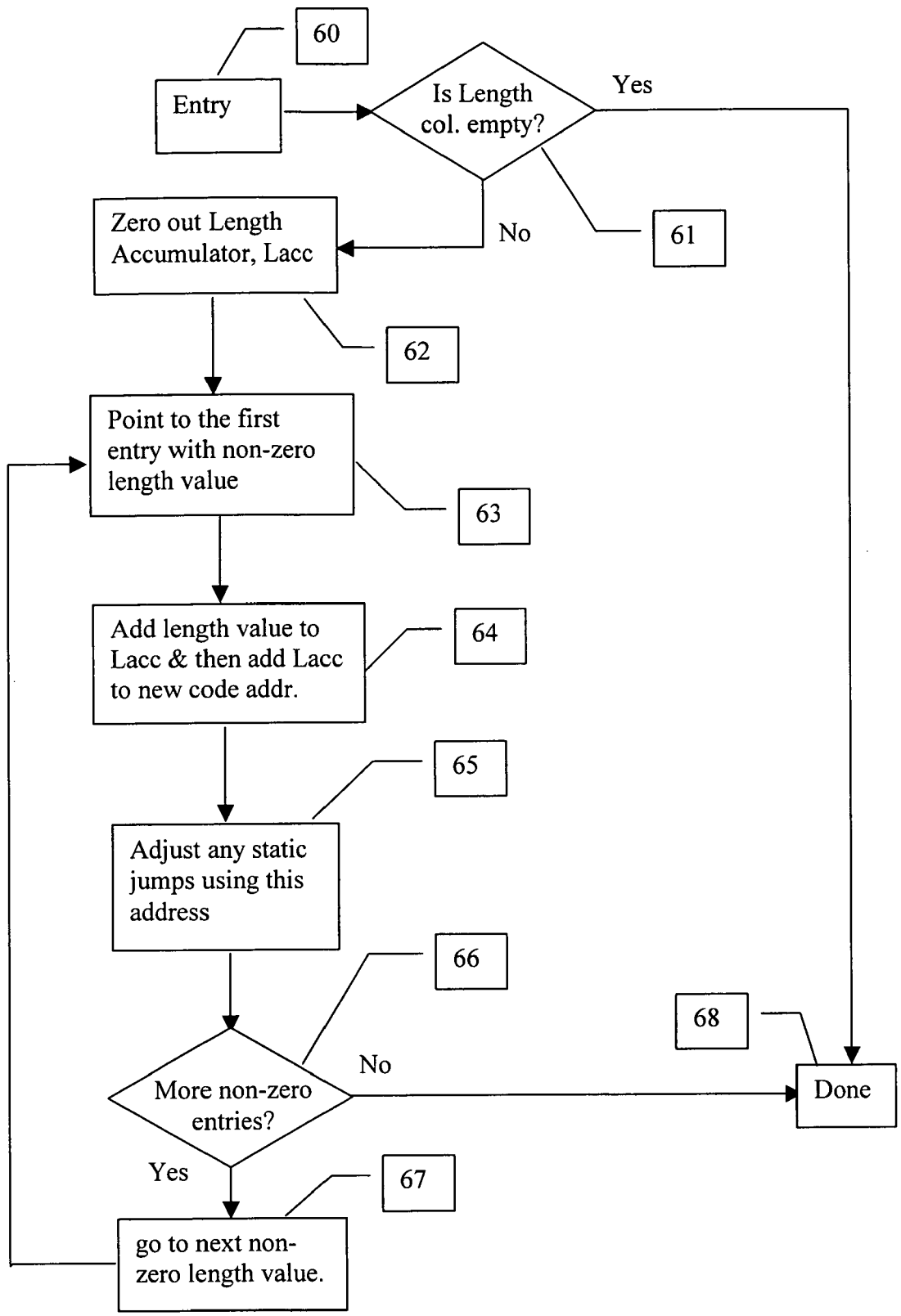
FIG. 6 illustrates the creation of the Offset Table according to specific embodiments of the invention.

In (36) update the ALT, Address Lookup Table to incorporate the new code just added. This process is described in detail in FIG. 6 and an example is shown in FIG. 9. New entries are added to the ALT, keeping it in order based on original addresses. Lookups are done by either finding the original address in the table as an entry or if there is no such entry, by finding the last entry that the lookup entry exceeds and deriving the required address offset from that by subtracting the old and new address values for that last entry. That offset is added to the address that is being looked up to create the lookup return value.

In (37) compute new label addresses for static branches, replacing each label with an address, using the ALT to lookup the new address. If necessary add the target address to the ALT, along with the location of the branch. The branch location may be needed later if the new target address is changed again later.

In an example embodiment, this proceeds generally in three steps as follows. First, note the current offset at each target label. Then look up that address in the Offset Table. Finally, add the table's offset value to the address to get the new address value. The table's offset value for an address is obtained by finding the last entry where the address is strictly less that the address value in the table entry and then using the offset value of that entry. This procedure is described in more detail in FIG. 8.

In (39) copy the current block to a new area, as needed. In general, the block needs to end up on a page that will be set as write-protected at run time.

When a DLL is Unloaded

Figure 4:
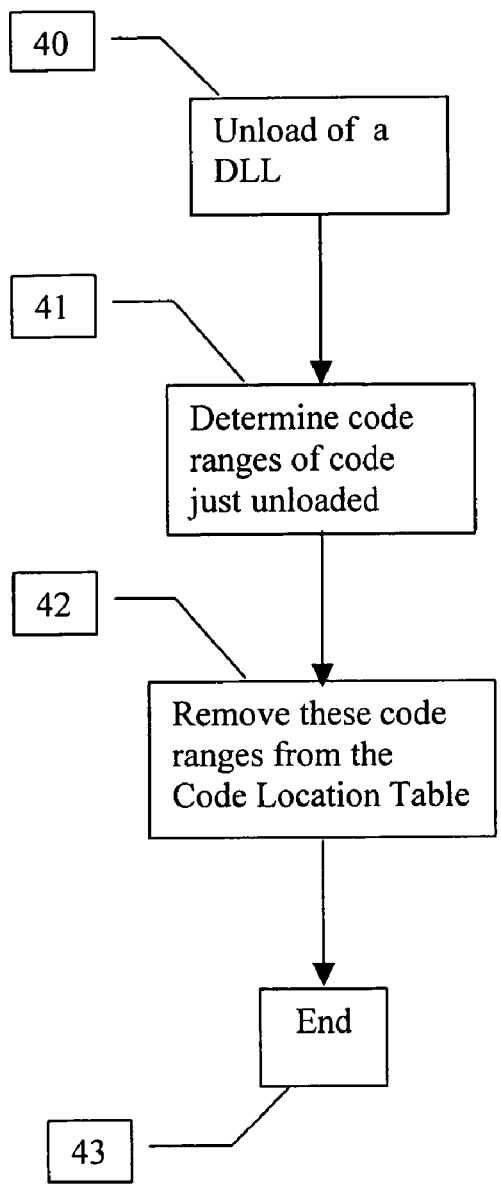
FIG. 4 illustrates the removal of code ranges from being valid when a DLL is unloaded according to specific embodiments of the invention.

Please refer to FIG. 4.

At (40) the process is initiated when or when the OS or application unloads a DLL during the application execution.

In (41) the System uses existing functions to find the code ranges of all code sections just unloaded and in (42) removes these code ranges from the Code Location Table. This process ends at (43).

Code Scanning

Scanning the code, as discussed above, in one example proceeds generally as shown in FIG. 5. At (51) the Security Deployment System examines the executable image to extract the application entry points and place them on a work list. There will be at least one entry point. At (52) the system obtains a start address from the work list which is used as the starting point to scan instructions. At (55) the system examines the instruction pointed to by the current instruction address. There are three possible cases for this instruction: control transfer, system call, or other.

If the instruction is a control transfer, including either a branch or a call, the system goes to step (54). At (54) if the target is new and has not been scanned already the system adds the control transfer target or targets to the work list. If the call is for setting up a "callback", said call specifies a target, that will be jumped to when a particular event occurs. For the purposes of this description, said call with its callback target will be treated as if it were a jump to that target. Specifically, this means that the processing for this instruction will follow the "No" path in (71). The system then goes on to (56).

If the instruction is a system call, the system goes directly to step (56). At (56) the system carries out the procedure in FIG. 7 to verify and insert code and insert transfer labels. At (57) the system adds an (address, code size) pair to an offset list for each section of code added. At (58) the system checks if there are more instructions. If so the system proceeds to (55), otherwise at (53) the system determines if the work list is empty. If so it proceeds to (59) and is done, otherwise proceeding to (52) and continuing on.

Creating the Offset Table

Updating the ALT, as discussed above, proceeds as shown in FIG. 6 beginning at the entry (60). At (61) if there is no entry with a non-zero length, this task is done, at (68). Otherwise at (62) set the Length Accumulator to zero. Then at (63) the system proceeds to the first entry with a non-zero length value. At (64) add this length value to the Length Accumulator, Lacc. Then add the Lacc value to the New Code Address column value.

At (65) any static jumps affected by this value are updated. The list of such static jumps is found in column 4 of the ALT.

At (66) there is a check for more entries with non-zero length values.

At (67) proceed to the next such entry and proceed to (63) if there is one.

When each non-zero length entry has been processed, the system concludes at (68).

Verify Targets

Figure 7:
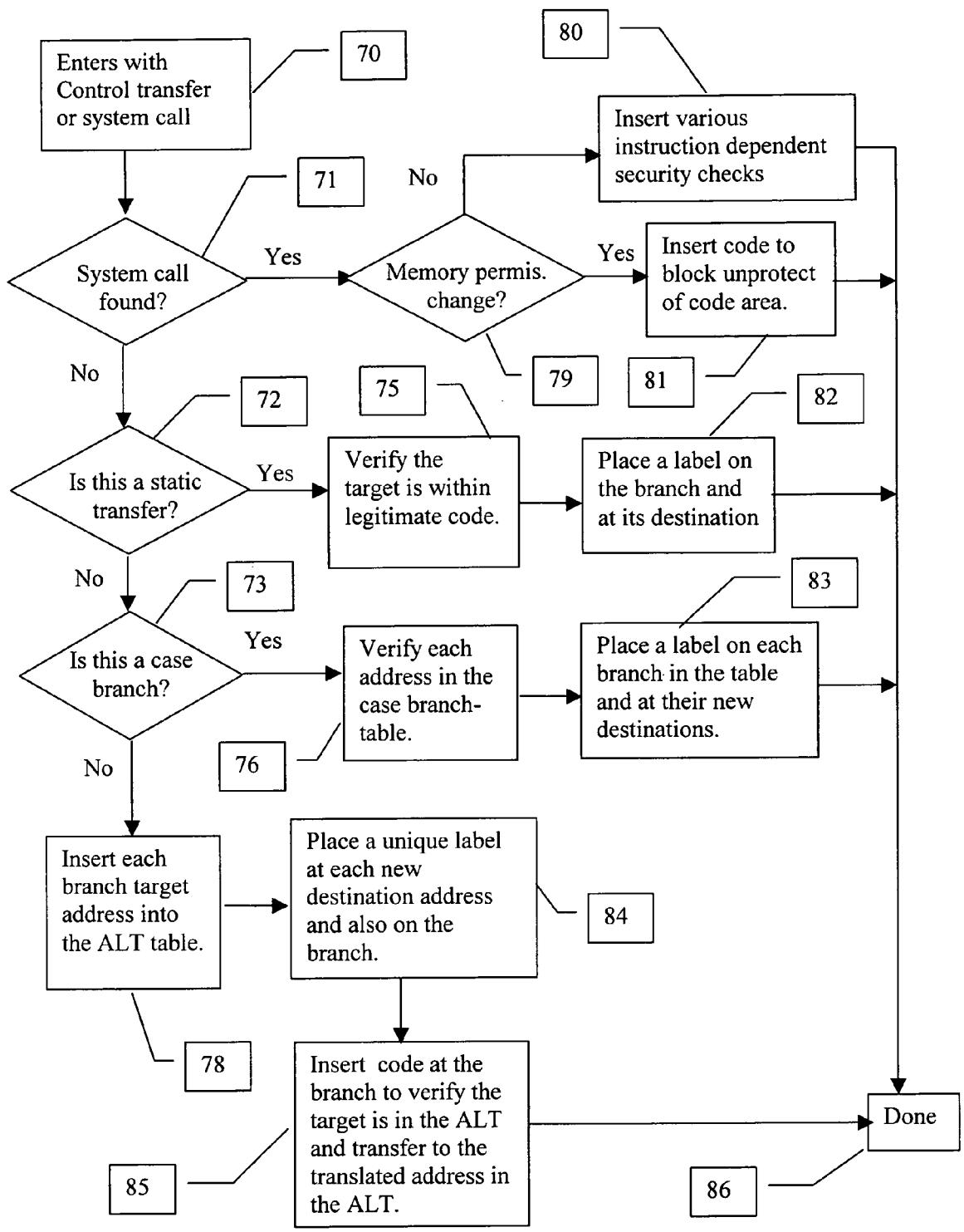
FIG. 7 illustrates an example of verifying and inserting code and inserting transfer labels according to specific embodiments of the invention.

Now refer to FIG. 7. This section of code is entered with a control transfer or system call at (70). If it is a system call, tested for by (71), it is handled as discussed below. If (71) did not find a system call, the system goes on to test for a static branch at (72) and if found is handled as discussed below. If the branch is not static, testing continues at (73) for a case branch. The most common source of dynamic branches are case-select statements, where the code contains a dynamic indirect branch through a table of static branch addresses. The case branch expression includes an offset into the branch table to select which target address to jump through. It is well known how to detect such tables using a backward analysis from the dynamic branch. Finally there are the other dynamic branches described below. As each of the above cases completes, processing for the method illustrated in FIG. 7 concludes (86).

System calls

According to specific embodiments, the invention inserts checking code around each system call in the application code to ensure that outgoing parameters and return values satisfy normal application-specific constraints. This done in (80). The Test (79) looks for system calls that change memory protection. These are checked to prevent changes to System code protection. Such checking is done by inserting code in (81).

Static Transfers

Static transfers are verified in (75) to insure they remain within valid code and go to proper destinations. At (82) explicit labels are placed at the source and target of the static transfer if the target is new. Any new static transfers are added to the ALT along with the location of the actual branch for later update purposes.

Case Branches

Dynamic branches from case statements are verified by checking the validity of the branch table addresses as in (76). In (83) the system places an explicit label at the target of each such static branch address, as well as on each address in the table. Any new static transfer values are added to the ALT along with the location of the actual table values for later update purposes.

Other Dynamic Branches

Other dynamic branches are handled in two basic ways according to specific embodiments of the invention. The invention can simply put off the discovery of the various targets until runtime and then deal with the branch target dynamically when a branch jumps to the new target as is described in runtime discovered branch targets below. With certain applications it is possible to discover the possible branch targets ahead of time. The system can instrument the remaining dynamic branches, if any, and identify their targets as the application is run under varying inputs.

Address Lookup Table

According to specific embodiments, the invention creates a runtime Address Lookup Table (ALT) and in (78) places each newly discovered branch target within it, along with the associated dynamic branch location. At (84) a unique label is placed at each new destination address and also on the corresponding branch. At (85) the system inserts checking code before each such dynamic branch. This code uses the address lookup table to verify that the runtime branch target is in the table and corresponds to that particular branch. After the check verifies the target, this code then transfers to the target.

Compute New Label Addresses

Figure 8:
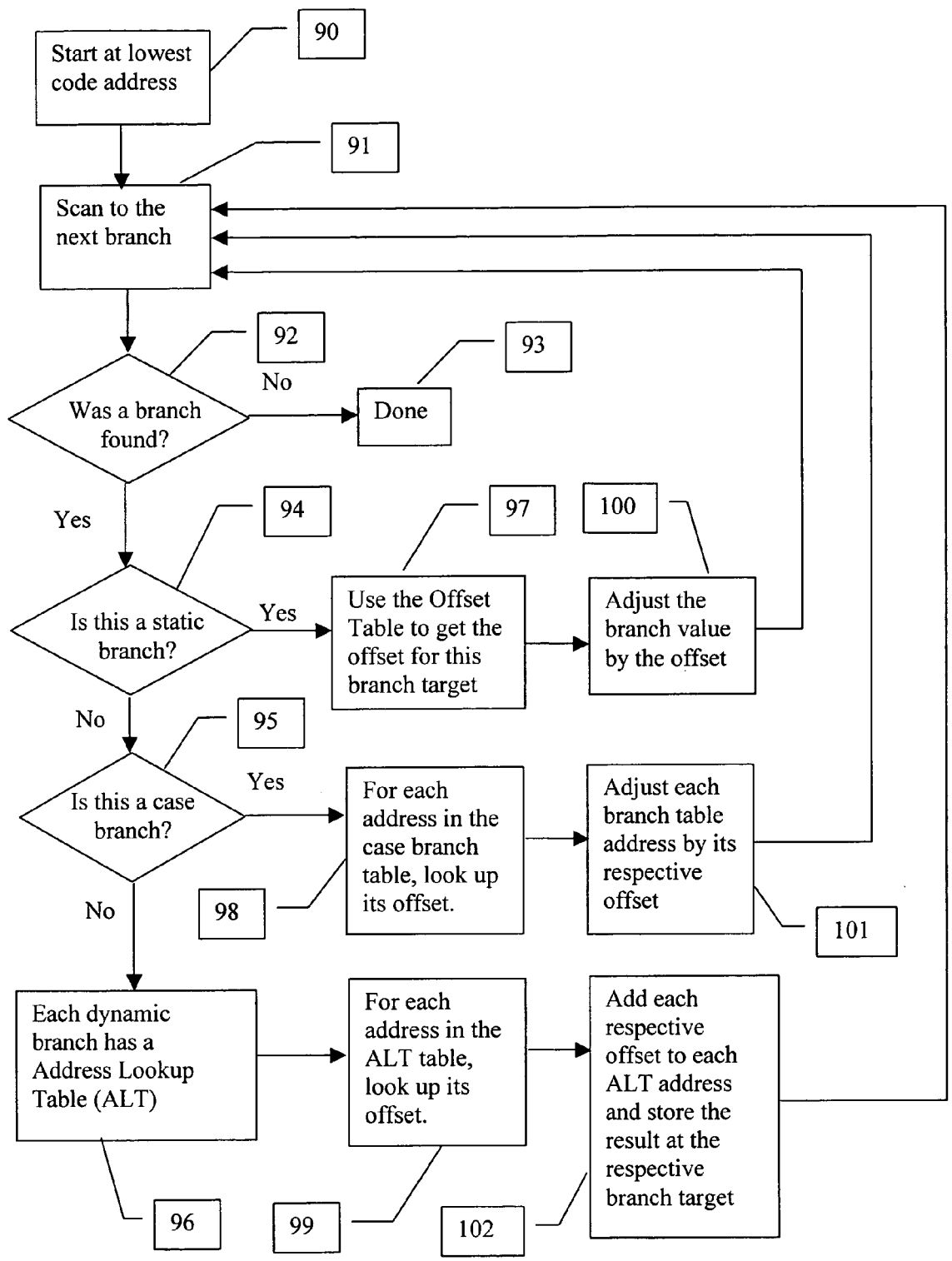
FIG. 8 illustrates an example of completing a block scan and adjusting code addresses according to specific embodiments of the invention.

As illustrated in the example in FIG. 8, a block scan is ended by reaching a branch instruction. At that point the system computes the label offsets for the labels just inserted as the block was being scanned. At (90) the procedure begins at the lowest code address, where the system scans through the code (91) looking for a branch and stopping at the end if none is found. At (92) the system determines if a branch was found. If not, the procedure is done at (93). Otherwise, the system continues on at (94) to test if the branch has a static target address. If so, the system continues on to (97) where it looks up the offset value for this static branch in the Offset Table. Then at (100) the system adds in the offset value to the branch target value in the branch code and continues on at (91).

If the branch was not static, the system continues on at (95) to see if the branch goes indirectly to a branch table containing static address values. Locating such tables, if they exist, is well known in the art. Such branches usually result from a case statement in the original source code and so are often called case branches. If there is such a table, at (98), the system takes each static address in the branch table and finds its offset, as in (97) by using the Offset Table. Then at (101) the system adds in the corresponding offset value to each respective static address of the case branch table and continues on at (91).

At (96) the system finds the associated Address Lookup Table (ALT) for this branch. At (99) for each address in the ALT, the system looks up its offset in the Offset Table. At (92) the system adds in the offset value to the corresponding address in the ALT. After that the system continues on at (91). This ends the processing described in FIG. 8.

Now refer to FIG. 9 which shows the effect of adding new instructions to a set of existing ones. Note that entries include the original address, a length field used in computing address changes in the new address field, which follows. The stages show how the lengths of added instructions accumulates to modify the address of instructions. As discussed earlier, there is a final field for tracking the static address values in static branches or branch tables that may need to be changed.

What is claimed:

1. A method of using binary code translation to introduce a security policy into a program run on a data processor, comprising:
    a) translating original program code for said program at runtime by adding code to implement said security policy;
    b) updating an address offset correction table each time code is added to provide a mapping from original program code addresses to relocated addresses in said translated code;
    c) as each branch is reached, determining whether the branch has a runtime computed branch target, termed a dynamic branch, or a static branch target;

d) stopping said translating at the dynamic branches;

e) translating branches with static branch targets by replacing the original branch targets with corrected target addresses provided by the address offset correction table;

f) continuing said translating at runtime at a dynamic branch where translation was previously stopped when said branch is executed; and g) continuing translating beginning at the target of said dynamic branch by using the original branch target address to lookup a corrected branch target address using said offset correction table;

whereby when execution reaches code at said target, the target code is translated to introduce the security policy and branch target addresses are corrected by taking into account the code address changes caused by inserting code at previous addresses.

2. A method according to claim 1 further comprising:

a) selecting said program by an administrator or user for security protection;

b) determining that said branch targets are only within the code of said program.

3. An apparatus using binary code translation to introduce a security policy into a program run on a data processor, comprising:

a) a means of translating code for said program at runtime by adding code to implement said security policy;

b) a means of updating an address offset correction table each time code is added to provide a mapping from original program code addresses to relocated addresses in said translated code;

c) a means of determining, as each branch is reached, whether the branch has a runtime computed branch target, termed a dynamic branch, or a static branch target;

d) a means of stopping said translating at the dynamic branches;

e) a means of translating branches with static branch targets by replacing the original branch targets with corrected target addresses provided by the address offset correction table;

f) a means of continuing said translation at runtime when a dynamic branch is executed; and g) a means of continuing said translation beginning at the target of said dynamic branch by using the original branch target address to lookup a corrected branch target address using said offset correction table;

whereby when execution reaches code at said target, the target code is translated to introduce the security policy and branch target addresses are corrected by taking into account the code address changes caused by inserting code at previous addresses.

4. An apparatus according to claim 3 further comprising:

a) a means of selecting said program by an administrator or user for security protection;

b) a means of determining that said branch targets are only within the code of said program.

\* \* \* \* \*